(12) United States Patent
Wiman et al.

(10) Patent No.: US 6,244,791 B1
(45) Date of Patent: Jun. 12, 2001

(54) INDEXABLE CUTTING INSERT

(75) Inventors: Jörgen Wiman, Sandviken; Jan-Olof Olsson, Kungsgården, both of (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/445,595

(22) PCT Filed: Jun. 18, 1998

(86) PCT No.: PCT/SE98/01182

§ 371 Date: Dec. 13, 1999

§ 102(e) Date: Dec. 13, 1999

(87) PCT Pub. No.: WO99/00207

PCT Pub. Date: Jan. 7, 1999

(30) Foreign Application Priority Data

Jun. 30, 1997 (SE) .................................................. 9702501

(51) Int. Cl.⁷ .................................................. B23B 27/22
(52) U.S. Cl. ........................ 407/114; 407/115; 407/116
(58) Field of Search .................................. 407/113, 114, 407/115, 116

(56) References Cited

U.S. PATENT DOCUMENTS

| | | | |
|---|---|---|---|
| 3,800,379 | 4/1974 | Hopkins | 29/95 |
| 4,606,678 | 8/1986 | Zweekly | 407/114 |
| 4,681,488 | 7/1987 | Markusson | 407/114 |
| 5,067,858 | * 11/1991 | Cook | 407/114 |
| 5,199,827 | 4/1993 | Pantzar | 407/42 |
| 5,505,569 | 4/1996 | Gustafsson et al. | 407/113 |
| 5,634,745 | * 6/1997 | Wiman et al. | 407/114 X |

FOREIGN PATENT DOCUMENTS

| | | | |
|---|---|---|---|
| 691 14 109 | 4/1996 | (DE) . | |
| 000490143 A2 | * 1/1991 | (EP) | 407/113 |
| 000489702 A2 | * 6/1992 | (EP) | 407/116 |
| 0 596 844 | 5/1994 | (EP) . | |
| 95/00272 | 1/1995 | (WO) . | |
| WO95000272 A1 | * 1/1995 | (WO) | 407/113 |

* cited by examiner

*Primary Examiner*—Henry Tsai
(74) *Attorney, Agent, or Firm*—Burns, Doane, Swecker & Mathis, L.L.P.

(57) ABSTRACT

An indexable insert for metal cutting having an upper surface, a bottom surface and side surfaces. At least a portion of the intersecting lines between the side surfaces and the upper surface generates a main cutting edge, a secondary cutting edge and a corner cutting edge. The corner portions of the upper side are provided with recesses. The corner cutting edge including at least two radiused edges having different radii. The first radiused edge, having a larger radius, being located adjacent to the main cutting edge and a second radiused edge, having a smaller radius, being located adjacent to the secondary cutting edge. Furthermore, the secondary cutting edge includes a radiused edge having a larger radius than the two aforementioned corner radiused edges and the recess includes a rear plane being so arranged that the chips hit a rear plane of the upper surface and break against the rear plane.

8 Claims, 3 Drawing Sheets

INDEXABLE CUTTING INSERT

BACKGROUND OF THE INVENTION

The present invention relates to an indexable insert primarily intended for turning.

In connection with all turning operations a certain correlation exists between feeding and nose radius, the latter constituting the transition between the main cutting edge and the secondary cutting edge of the insert. Thus, in connection with rough machining the largest possible nose radius should be chosen in order to achieve a strong cutting edge. On the other hand a too large nose radius may cause vibrations. Therefore, in connection with fine turning a smaller nose radius is usually selected, normally always smaller than 2 mm. The disadvantage in connection with a small nose radius is that it increases the rate of wear of the insert and thus decreases the tool-life and the performance. The achieved surface finish of the workpiece is affected of the correlation between nose radius and feeding.

The entering angle is defined as the angle between the main cutting edge and the feeding direction. This angle has a considerable influence upon the mutual relationship between the different component vectors of the cutting forces and hence also upon surface finish and dimensional accuracy. The angle of tool back clearance is the angle between the secondary cutting edge and the feeding direction and it has an influence upon the smoothness of the turned surface. It is obvious that for a given insert the entering angle may not be changed without simultaneously changing the relief angle. Thus the surface finish and the dimensional accuracy are to a high degree sensitive to changes of the entering angle.

A permanent problem in connection with turning operations is that the desired surface finish is not achieved. Sometimes the surface finish may be improved by using a higher cutting speed and neutral or positive rake angles. However, the sensitivity to the adjustment of the entering angle still remains.

Round inserts may often manage a number of profiling operations from fine machining to rough machining. Said inserts usually have the shape of a truncated cone in order to allow sufficient clearance below the edge. For this reason said inserts are normally single-sided. Usually the round inserts generate a fine surface also in connection with high feeding since the round edge functions as a wiper, however the chip control may easily become deficient, especially in connection with small cutting depths when relatively wide and thin chips are formed that could be hard to break. Thereby long curled chips are formed that at worst may entangle around the insert holder and scratch the generated surface and possibly cause chip breakdown. Further they are afflicted with the inherent disadvantage that it is not possible to select an entering angle at a certain cutting depth since the insert is round. As an example of round inserts reference is made to U.S. Pat. No. 4,606 678.

A primary object of the present invention is thus to improve the deficient chip control that often is present in connection with round inserts, however the surface finish is maintained.

SUMMARY

Accordingly the present invention provides an indexable insert for metal cutting comprising an upper surface having corner portions, a bottom surface, and side surfaces joining said two surfaces, and a plurality of intersecting lines between the side surfaces and the upper surface, at least a portion of the intersecting lines between the side surfaces and the upper surface generating at least one main cutting edge, a secondary cutting edge, and a corner cutting edge, and each corner portion of the upper surface being provided with a recess, wherein said corner cutting edge includes at least two radiused edges having different radii, such that a first of the radiused edges has a larger radius and is located adjacent to the main cutting edge and a second of the radiused edges has a smaller radius and is located adjacent to the secondary cutting edge, and the secondary cutting edge includes a radiused edge with a radius that is larger than said two corner radiused edges, and said recess includes a rear plane being so arranged that the chips generated by said cutting edge hit said rear plane and break against said rear plane.

In exemplifying but not restricting purpose the invention will now described with reference to the accompanying drawings.

DETAILED DESCRIPTION OF THE EMBODIMENTS

Figure 1:
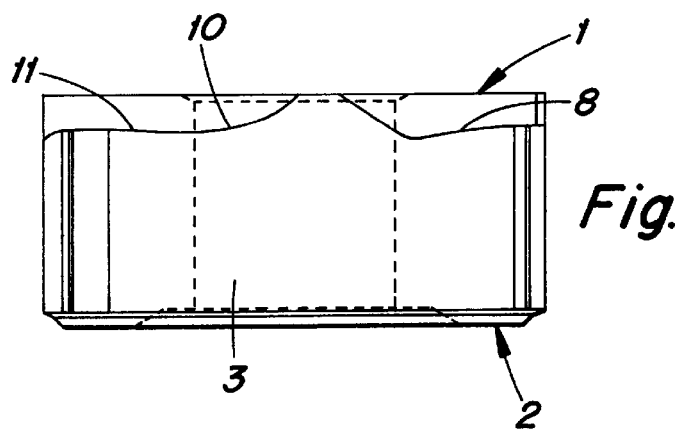
FIG. 1 shows an indexable insert according to the invention directly from the side.
Figure 2:
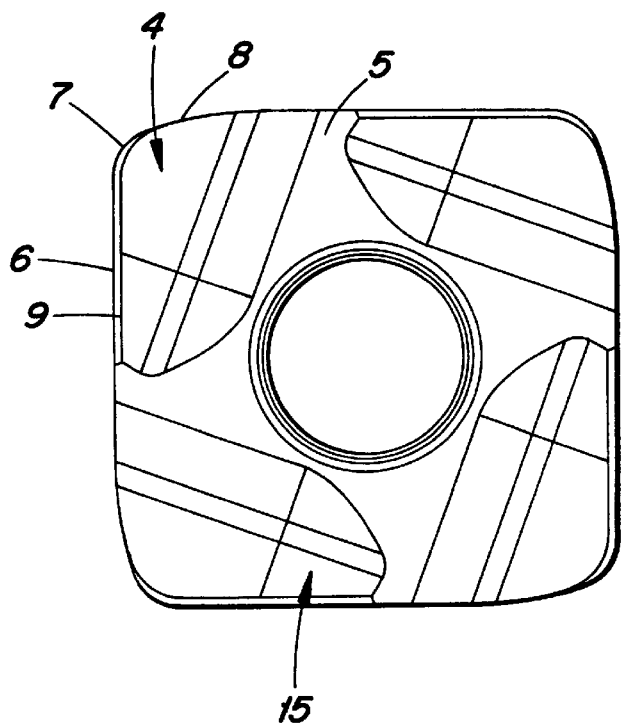
FIG. 2 shows the same indexable insert as FIG. 1 in top view.
Figure 3:
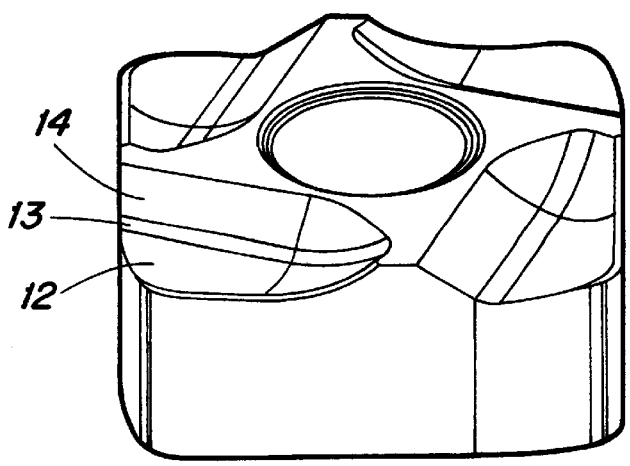
FIG. 3 shows, in an inclined perspective view from above, the same indexable insert as in FIGS. 1 and 2.

The FIGS. 1–3 thus show a preferred embodiment of an insert according to the invention. Said insert has an upper surface 1, a bottom surface 2, and four side surfaces 3 extending between said surfaces. Even if the insert preferably has square basic shape it may also be triangular, rhombic, rhomboidic or rectangular. It is usually manufactured from coated or uncoated cemented carbide.

Each corner portion at its upper side 1 has a longitudinal recess 4 that intersects the side surfaces 3 of the insert along a line having a lower position than the planar top surface 5 of the upper side. Thereby, the outer contour of each recess forms a main cutting edge 6, a corner edge 7 and a secondary cutting edge or wiper 8. In order to reinforce the main cutting edge 6 it may be reinforced by a primary land 9. Seen from the top surface 5 the main cutting edge comprises initially a curved portion 10 and then an essentially straight edge portion 11 that either may be parallel to the bottom surface 2 of slightly angled relative to said surface. The secondary cutting edge 8 may also be essentially parallel to the bottom surface 2, but is preferably angled in accordance with FIG. 1 in order to balance it, especially in connection with high feedings. The angle of the edge 8 relative to the bottom surface 2 is preferably in the interval 2–10°.

Behind the primary land 9 and the secondary cutting edge 8 a preferably curved, downwards slooping land portion 12 extends, said portion reaching the longitudinal recessed bottom 13. At the opposite side of said bottom 13 an upwards slooping rear plane 14 extends, said plane being connected with the top surface 5. The surfaces 12, 13 and 14 decline and are terminated in a doomed recessed end portion 15. The rear plane 14 may either be a concave radiused surface or essentially planar. It serves as an abutment surface for the generated chips and it breaks those chips, thus providing a proper and even chip control, in combination with the geometry of the corner edge that now will be described.

Figure 4:
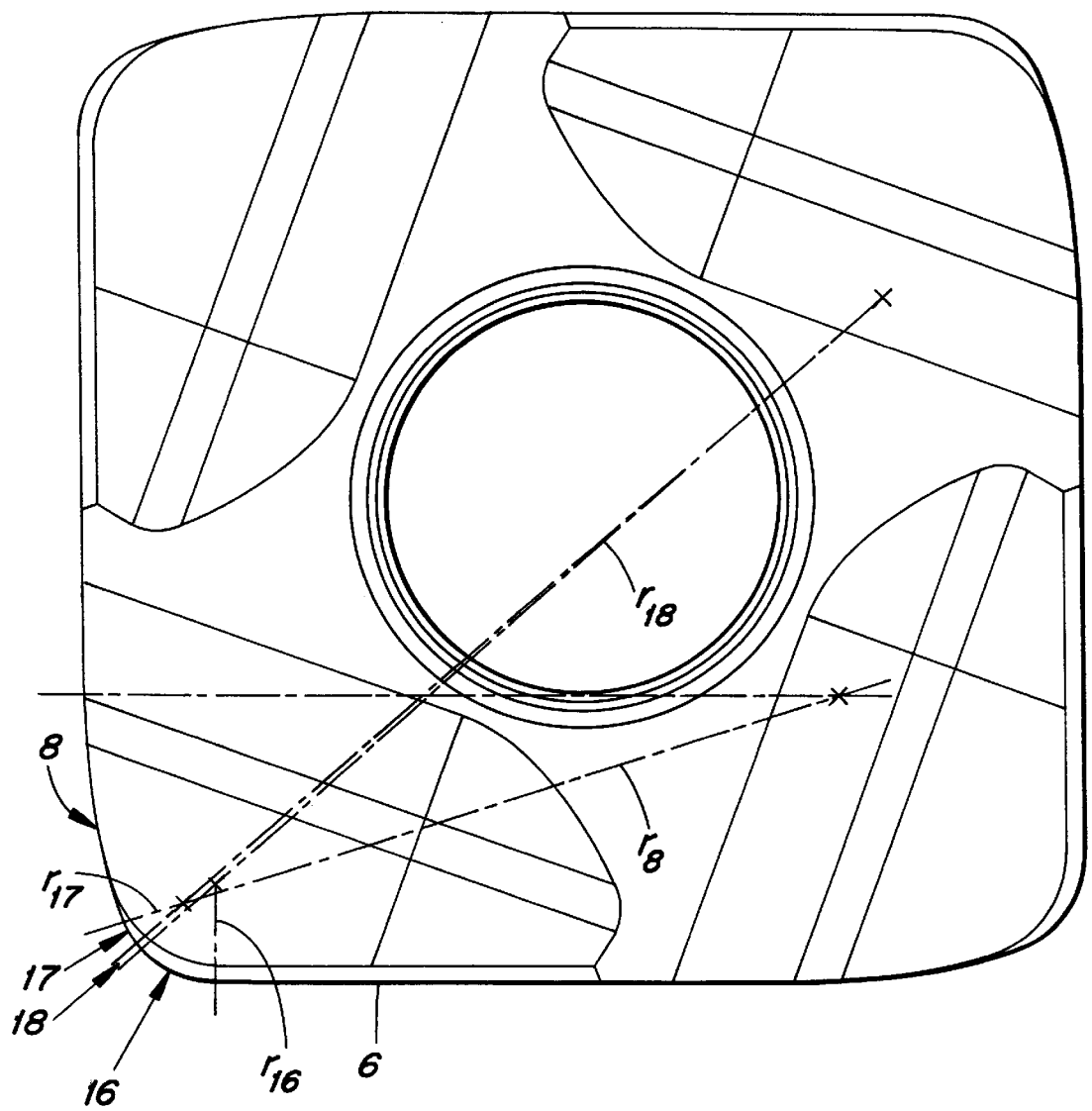
FIG. 4 shows the same top view as FIG. 2 but in an enlarged scale.
Figure 5:
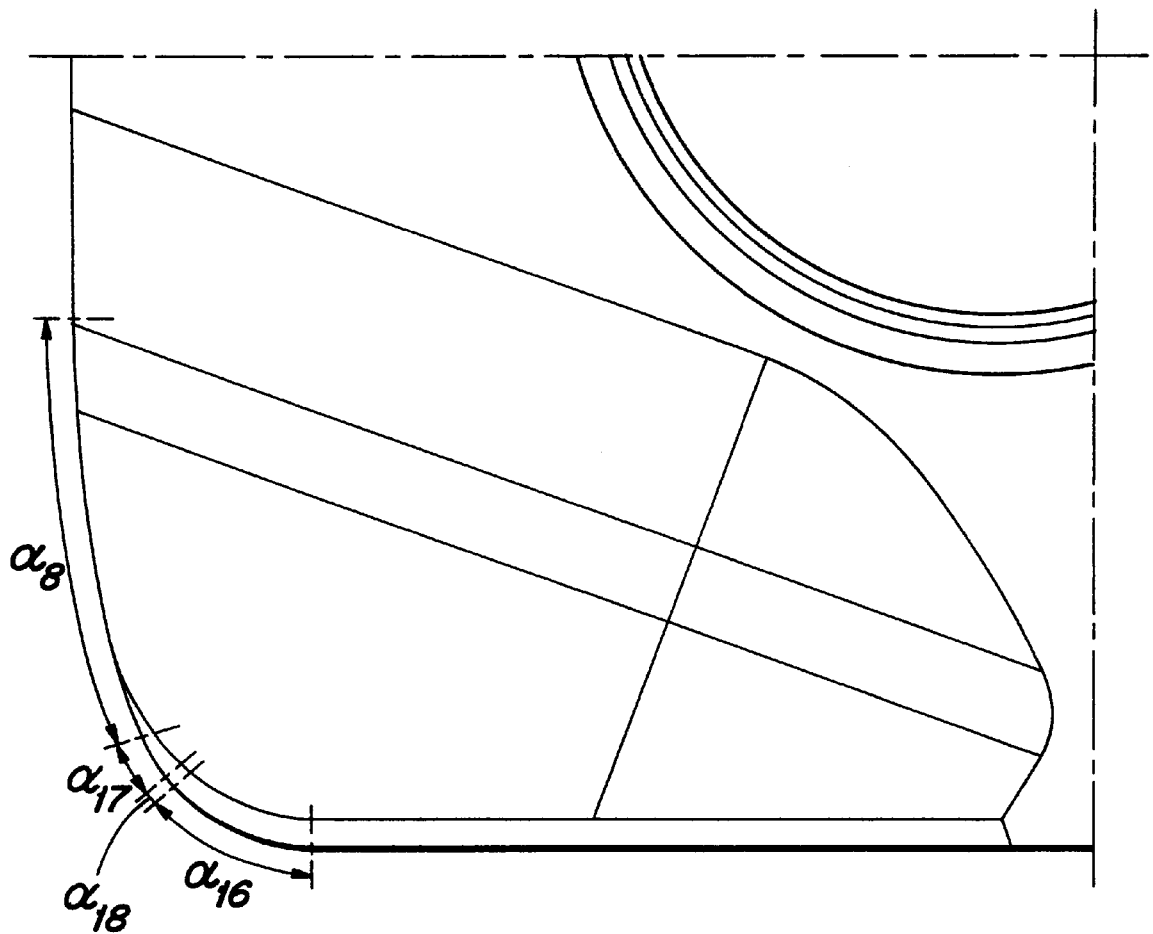
FIG. 5 shows in enlarged scale a corner from FIG. 4.

With the reference to FIG. 4 a corner portion of the invention includes a first radiused edge 16 adherent to the main cutting edge 6, and a second radiused edge 17 close to the secondary cutting edge 8. In order to fineadjust the optimum geometry and to provide a smooth transition between the adjacent two radiused edges also a short edge portions may be provided between said radiused edges 16 and 17. Also this short edge portion may have a certain curvature, the radius of said portion being essentially larger than the radii of the radiused edges 16 and 17. Further, the secondary cutting edge 8 has a radius that essentially corresponds to the radius, the angle of tool back clearance and the clearance of a round insert. Thus, the secondary cutting edge 8 could be said to constitute a segment of an imaginary, circular round insert. However, the essential advantage compared to a round insert is that the corner radius edges 16, 17 generates essentially narrower and thicker chips compared to what a round inserts would have performed under the same operational parameters, this together with the breaking action of the rear plane 14 resulting in an excellent chip control.

In order to achieve maximum chip control the radii $r_8$, $r_{16}$, $r_{17}$ and $r_{18}$ of the radiused edges 8,16, 17 and 18 respectively should be within the following intervals:

$r_g$: 2.5–20 mm $r_{16}$: 0.3–3 mm $r_{17}$: 0.2–1.7 mm $r_{18}$: 4.0–∞ mm, however the condition being that:

$r_{18} > r_8 > r_{16} > r_{17}$

The different radii $r_8$, $r_{16}$, $r_{17}$ and $r_{18}$ respectively are designated in FIG. 4. The different lengths of the radiused edges 8, 16, 17, 18 may also be defined by the centre angles $\alpha_8$, $\alpha_{16}$, $\alpha_{17}$ and $\alpha_{18}$ that the segment lengths of the radiused edges encircle. These may preferably be in the following intervals:

$\alpha_8$: 10–25°

$\alpha_{16}$: 35–65°

$\alpha_{17}$: 15–35°, and $\alpha_{18}$: 0–10°

Thus, by combining, in accordance with the present invention, a specific sequence of different radiused edges with a chip breaking rear plane a surprisingly excellent chip control has been achieved, in combination with very fine surfaces. Especially this optimum combination has been achieved in connection with difficult operational conditions, like the combination of small cutting depths and high feedings.

What is claimed is:

1. An indexable insert for metal cutting comprising:
   an upper surface,
   a bottom surface,
   side surfaces joining said upper and bottom surfaces,
   a plurality of intersecting lines between the side surfaces and the upper surface,
   at least a portion of the intersecting lines between the side surfaces and the upper surface generating:
     at least one main cutting edge,
     a secondary cutting edge,
     corner portions of the upper surface being provided with a recess, and
     a corner cutting edge, said corner cutting edge having a bisector,
   wherein said corner cutting edge includes at least two corner radiused edges having different radii, such that a variation of the radii around said bisector of the corner cutting edge of the insert is asymmetrical and that a first of the radiused edges has a larger radius and is located adjacent to the main cutting edge and a second of the radiused edges has a smaller radius and is located adjacent to the secondary cutting edge, and the secondary cutting edge includes a radiused edge with a radius that is larger than said two corner radiused edges, and each of said recesses includes a rear plane being so arranged that the chips generated by said cutting edges hit said rear plane and break against said rear plane.

2. The indexable insert according to claim 1, wherein between said corner radiused edges a transition radiused edge is provided, said transition radiused edge constituting a transition between said corner radiused edges, the radius of said transition radiused edge being larger than the radius of the secondary cutting edge and the radii of the two corner radiused edges.

3. The indexable insert according to claim 1, wherein the radius of the secondary cutting edge is between 2.5 and 20 mm.

4. The indexable insert according to claim 1, wherein the corner radiused edge closest to the main cutting edge has a radius between 0.3 and 3 mm.

5. The indexable insert according to claim 1, wherein the corner radiused edge closest to the secondary cutting edge has a radius between 0.2 and 1.7 mm.

6. The indexable insert according to claim 2, wherein the radius of the secondary cutting edge is between 2.5 and 20 mm.

7. The indexable insert according to claim 2, wherein the corner radiused edge closest to the main cutting edge has a radius between 0.3 and 3 mm.

8. The indexable insert according to claim 2, wherein the corner radiused edge closest to the secondary cutting edge has a radius between 0.2 and 1.7 mm.

* * * * *